(12) United States Patent
Wentink

(10) Patent No.: US 8,576,809 B2
(45) Date of Patent: Nov. 5, 2013

(54) FACILITATING DISTRIBUTED CHANNEL ACCESS FOR A PLURALITY OF ACCESS TERMINALS TRANSMITTING IN A WIRELESS COMMUNICATION ENVIRONMENT

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 12/899,668

(22) Filed: Oct. 7, 2010

(65) Prior Publication Data

US 2012/0087348 A1    Apr. 12, 2012

(51) Int. Cl.
*H04L 29/06* (2006.01)

(52) U.S. Cl.
USPC ............ 370/336; 370/345; 709/225; 455/450

(58) Field of Classification Search
USPC ................... 370/336, 345; 709/225; 455/450
See application file for complete search history.

(56) References Cited

U.S. PATENT DOCUMENTS

| 7,742,441 | B2 * | 6/2010 | Willey | 370/312 |
|---|---|---|---|---|
| 7,801,104 | B2 * | 9/2010 | Gaur | 370/345 |
| 7,944,940 | B2 * | 5/2011 | Ma et al. | 370/447 |
| 8,179,867 | B2 * | 5/2012 | Seok | 370/336 |
| 2004/0024871 | A1 * | 2/2004 | Kitchin | 709/225 |
| 2005/0249173 | A1 * | 11/2005 | Salokannel et al. | 370/338 |
| 2008/0095124 | A1 * | 4/2008 | Ramos et al. | 370/336 |
| 2008/0101308 | A1 | 5/2008 | Gaur | |
| 2009/0059824 | A1 * | 3/2009 | Wentink | 370/310 |
| 2009/0213816 | A1 * | 8/2009 | Guo et al. | 370/336 |
| 2009/0279487 | A1 * | 11/2009 | Reumerman et al. | 370/329 |
| 2010/0226343 | A1 * | 9/2010 | Hsu et al. | 370/336 |
| 2012/0008600 | A1 * | 1/2012 | Marinier et al. | 370/336 |
| 2012/0099568 | A1 * | 4/2012 | Wentink | 370/338 |
| 2012/0213208 | A1 * | 8/2012 | Hsu et al. | 370/336 |

FOREIGN PATENT DOCUMENTS

| WO | WO2007137251 | 11/2007 |
|---|---|---|
| WO | WO2009002296 A1 | 12/2008 |
| WO | WO 2009002296 A1 * | 12/2008 |

OTHER PUBLICATIONS

Energy Efficiency modeling for IEEE 802.11 DCF system without retry limits, Computer Communications, Nov. 13, 2006; by Wen-Kuang Kuo.*
International Search Report and Written Opinion—PCT/US2011/055424—ISA/EPO—Dec. 6, 2011.

* cited by examiner

*Primary Examiner* — Charles C Jiang
*Assistant Examiner* — Deepa Belur
(74) *Attorney, Agent, or Firm* — Kevin T. Cheatham

(57) ABSTRACT

Methods and apparatuses are provided for facilitating distributed transmissions among a plurality of access terminals. An access point may send an initial indicator count for each access terminal to follow a respective number of indicators when transmitting during a transmission opportunity. An access terminal may receive its respective initial indicator count, and may send a transmission after detecting a number of indicators equal to the assigned initial indicator count. A continuation indicator count may also be sent to each access terminals, where the continuation indicator count specifies a number of indicators each access terminal is to wait after sending a preceding transmission and before sending a subsequent transmission.

49 Claims, 7 Drawing Sheets

FACILITATING DISTRIBUTED CHANNEL ACCESS FOR A PLURALITY OF ACCESS TERMINALS TRANSMITTING IN A WIRELESS COMMUNICATION ENVIRONMENT

BACKGROUND

1. Field

Various features disclosed herein pertain generally to wireless communication systems, and at least some features pertain to devices and methods for facilitating distributed channel access for uplink transmissions from a plurality of access terminals in a wireless communication system.

2. Background

Access terminals, such as laptop computers, personal digital assistant devices, mobile or cellular phones, personal media players, or any other device with a processor, that communicate with other devices through wireless signals are becoming increasingly popular and are used more frequently. Such increases in distribution and use of access terminals have resulted in the demand for greater bandwidth. In order to address the issue of increasing bandwidth demands, different schemes are being developed to allow multiple access terminals to communicate by sharing channel resources while achieving high data throughputs.

Multiple Input or Multiple Output (MIMO) technology represents one such approach that has emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Although MIMO technologies are effective in allowing multiple access terminals to communicate by sharing channel resources without causing collisions, there remains a need for a solution to facilitate distributed transmissions among a plurality of transmitter devices sharing a common channel or frequency band.

SUMMARY

Various features facilitate distributed channel access for a plurality of access terminals. One feature provides access terminals adapted to facilitate distributed transmissions on a shared transmission channel. Such access terminals may include a communications interface adapted to facilitate wireless communications and a processing circuit coupled to the communications interface. In one example, the communications interface may be adapted to facilitate wireless communications in an Institute of Electrical and Electronics Engineers (IEEE) 802.11 wireless local area network (WLAN). The processing circuit may be adapted to receive a first transmission via the communications interface. The first transmission may include a first indicator count that specifies a number of indicators that are to occur before the access terminal is initially allowed to transmit over the shared transmission channel. That is, the first indicator count may specify a number of empty backoff slots that are to occur on the shared transmission channel before the access terminal is allowed to transmit on the shared transmission channel. After receiving the transmission, the processing circuit may monitor the shared transmission channel to detect one or more indicators. Upon detection of a number of indicators equal to the first indicator count, the processing circuit may send, via the communications interface, a second transmission over the shared transmission channel.

In one example, an indicator may comprise an empty backoff slot, which may occur only after an interframe space during which there is no transmission on the shared transmission channel. An interframe space may comprise a time interval defined by one of a short interframe space (SIFS), an arbitration interframe space (AIFS), a point coordination function (PCF) interframe space (PIFS), or a distributed coordination function (DCF) interframe space (DIFS).

The processing circuit may also be adapted to receive a second indicator count. For instance, the second indicator count may be part of the first transmission or a separate transmission. The access terminal may be assigned to wait after sending a preceding transmission for a number of indicators equal to the second indicator count before the access terminal is allowed to send a subsequent transmission.

In one example, the processing circuit may be further adapted to: (a) monitor the shared transmission channel after sending the second transmission to detect one or more indicators; and/or (b) send a third transmission via the communications interface after detecting a number of indicators equal to the second indicator count. In one example, the second indicator count may be the same for the access terminal as it is for one or more other access terminals communicating on the shared transmission channel. The second indicator count may specify a number of empty backoff slots that are to occur on the shared transmission channel before the access terminal is allowed to transmit on the shared transmission channel. The processing circuit may be further adapted to reset a network allocation vector (NAV) upon receipt of the first transmission including the first indicator count.

A method operational in an access terminal is also provided according to one feature for facilitating distributed transmissions on a shared transmission channel. For instance, a first transmission may be received that includes a first indicator count. The first indicator count may specify a number of indicators that are to occur before the access terminal is initially allowed to transmit over the shared transmission channel. The access terminal may monitor the shared transmission channel to detect one or more indicators after receiving the first transmission. Upon detection of a number of indicators equal to the first indicator count, a second transmission may be sent over the shared transmission channel. In addition, a second indicator count may be received. The second indicator count may specify a number of indicators that are to occur after the access terminal sends a preceding transmission and before the access terminal is allowed to send a subsequent transmission.

Another feature provides access points adapted to facilitate distributed transmissions for a plurality of access terminals on a shared transmission channel. According to one or more implementations, such an access point may include a communications interface adapted to facilitate wireless communications, and a processing circuit coupled to the communications interface. In one example, the communications interface may be adapted to facilitate wireless communications in an Institute of Electrical and Electronics Engineers (IEEE) 802.11 wireless local area network (WLAN). The processing circuit may be adapted to send a first transmission via the communications interface to a plurality of access terminals. For example, the first transmission may comprise one of a broadcast transmission or a unicast transmission. The first transmission may include a respective first indicator count for each access terminal, where each respective first indicator count specifies a respective number of indicators that are to occur before each access terminal is initially allowed to transmit over the shared transmission channel. The first transmission may further include a second indicator count, where each access terminal is assigned to wait for a number of indicators equal to the second indicator count after sending a respective preceding transmission and before sending a respective subsequent transmission. Following the first transmission, the processing circuit may receive, via the communications interface, a return transmission from each of the plurality of access terminals in a sequential order according to the respective first indicator count for each access terminal.

An indicator may comprise an empty backoff slot, which may occur after an interframe space during which there is no transmission on the shared transmission channel. The interframe space may comprise a time interval defined by one of a short interframe space (SIFS), an arbitration interframe space (AIFS), a point coordination function (PCF) interframe space (PIFS), or a distributed coordination function (DCF) interframe space (DIFS).

In one example, the processing circuit is further adapted to include a second indicator count in the first transmission, wherein each access terminal is assigned to wait for a number of indicators equal to the second indicator count after sending a respective preceding transmission and before sending a respective subsequent transmission. The second indicator count may comprise a number that is equal to or greater than a number of access terminals comprising the plurality of access terminals. The second indicator count may be the same for all access terminals of the plurality of access terminals.

A method operational in an access point is also provided according to a feature for facilitating distributed transmissions for a plurality of access terminals on a shared transmission channel. According to at least one implementation, such a method may include sending a first transmission to a plurality of access terminals. The first transmission may include a respective first indicator count for each access terminal, where each respective first indicator count specifies a respective number of indicators that are to occur before each access terminal is initially allowed to transmit over the shared transmission channel. The first transmission may further include a second indicator count specifying a number of indicators that are to occur after each access terminal sends a respective preceding transmission and before sending a respective subsequent transmission. Following the first transmission, a return transmission may be received over the shared transmission channel from each of the plurality of access terminals in a sequential order according to the respective first indicator count for each access terminal.

DETAILED DESCRIPTION

Figure 1:
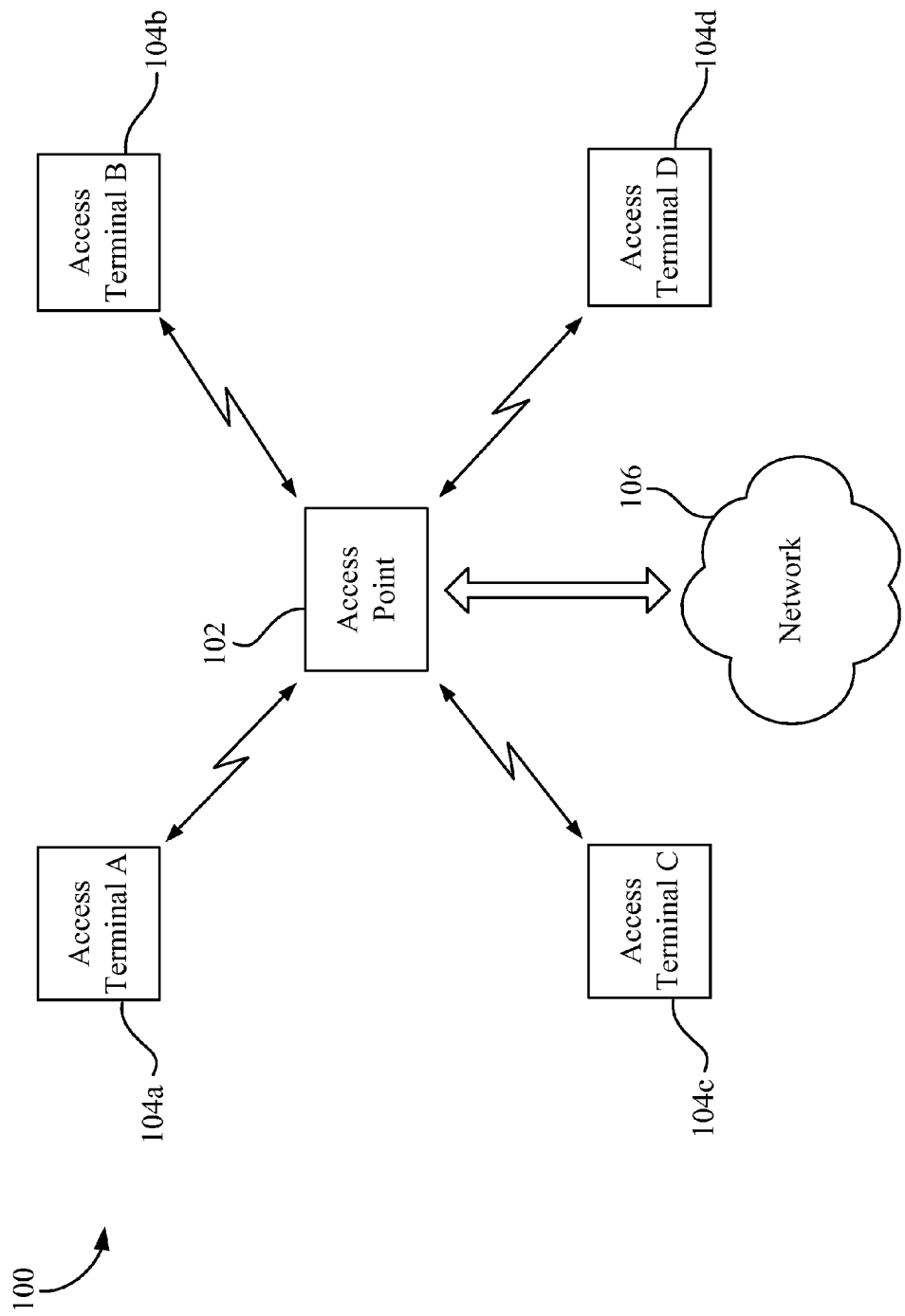
FIG. 1 is a block diagram illustrating how one or more access terminals may operate within a communication network.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation. The terms "access point" and "access terminal" as used herein are meant to be interpreted broadly. For example, an "access point" may refer to a device that facilitates wireless connectivity (for one or more access terminals) to a communication or data network. Examples of "access points" may include base stations, Node-B devices, femto cells, pico cells, etc. Furthermore, an "access terminal" may include mobile phones, pagers, wireless modems, personal digital assistants, personal information managers (PIMs), palmtop computers, laptop computers, and/or other mobile communication/computing devices which communicate, at least partially, through a wireless or cellular network.

Overview

One feature provides apparatuses and methods for facilitating distributed transmissions for a plurality of access terminals sharing a common uplink channel. An access point may identify a sequence for distributing transmissions on a shared transmission channel among a plurality of access terminals. The access point sends a transmission to each access point that includes an initial (or first) indicator count specifying a respective number of indicators that the access terminal is to follow during a transmission opportunity. Each access terminal receives the first indicator count and monitors the transmission channel for indicators. After detecting a number of indicators that matches the respective initial indicator count, the access terminal may send a transmission on the transmission channel.

In order to facilitate continuous or repeated groups (or clusters) of transmissions according to the distributed sequence, the access point may also send a continuation (or second) indicator count specifying a number of indicators each access terminal should wait after sending a preceding transmission and before sending a subsequent transmission. After an access terminal sends a respective transmission, the access terminal may monitor the transmission channel for indicators. After detecting a number of indicators matching the second indicator count, the access terminal may send another transmission.

Exemplary Network Environments

FIG. 1 is a block diagram illustrating how one or more access terminals may operate within a wireless communication system. A wireless communication system 100 may include one or more access points 102 in wireless communication with one or more access terminals 104. An access point 102 is adapted to provide access to a communication network 106 for the access terminals 104. The access point 102 may communicate wirelessly with each of the access terminals 104. For example, the access point 102 may send wireless communications to the access terminals 104 over a downlink transmission, and the access terminals 104 may send wireless communications to the access point 102 over an uplink transmission.

Multiple access terminals 104 may be in wireless communication with a single access point 102 at any given time. For example, access terminals 104a, 104b, 104c and 104d may each be in wireless communication with the access point 102 at a particular time. As such, the access point 102 may be adapted to support MIMO technology. In at least one implementation, the access point 102 is adapted to operate in an IEEE 802.11 wireless local area network (WLAN).

In at least some instances, the access terminals 104 may communicate transmissions with the access point 102 in the uplink direction using a shared uplink channel (or frequency band). In order to facilitate the plurality of access terminals 104 sharing the uplink channel, the access point 102 may employ distributed channel access. For example, each access terminal 104 may communicate in the uplink direction using a designated uplink transmission opportunity that is determined to occur after a designated number of indicators. In order to facilitate such distributed channel transmissions, the access point 102 may be adapted to manage the channel access distribution sequence among the various access terminals 104 by assigning a unique uplink transmission opportunity to each access terminal 104.

Distributed Channel Access Among a Plurality of Access Terminals

Figure 2:
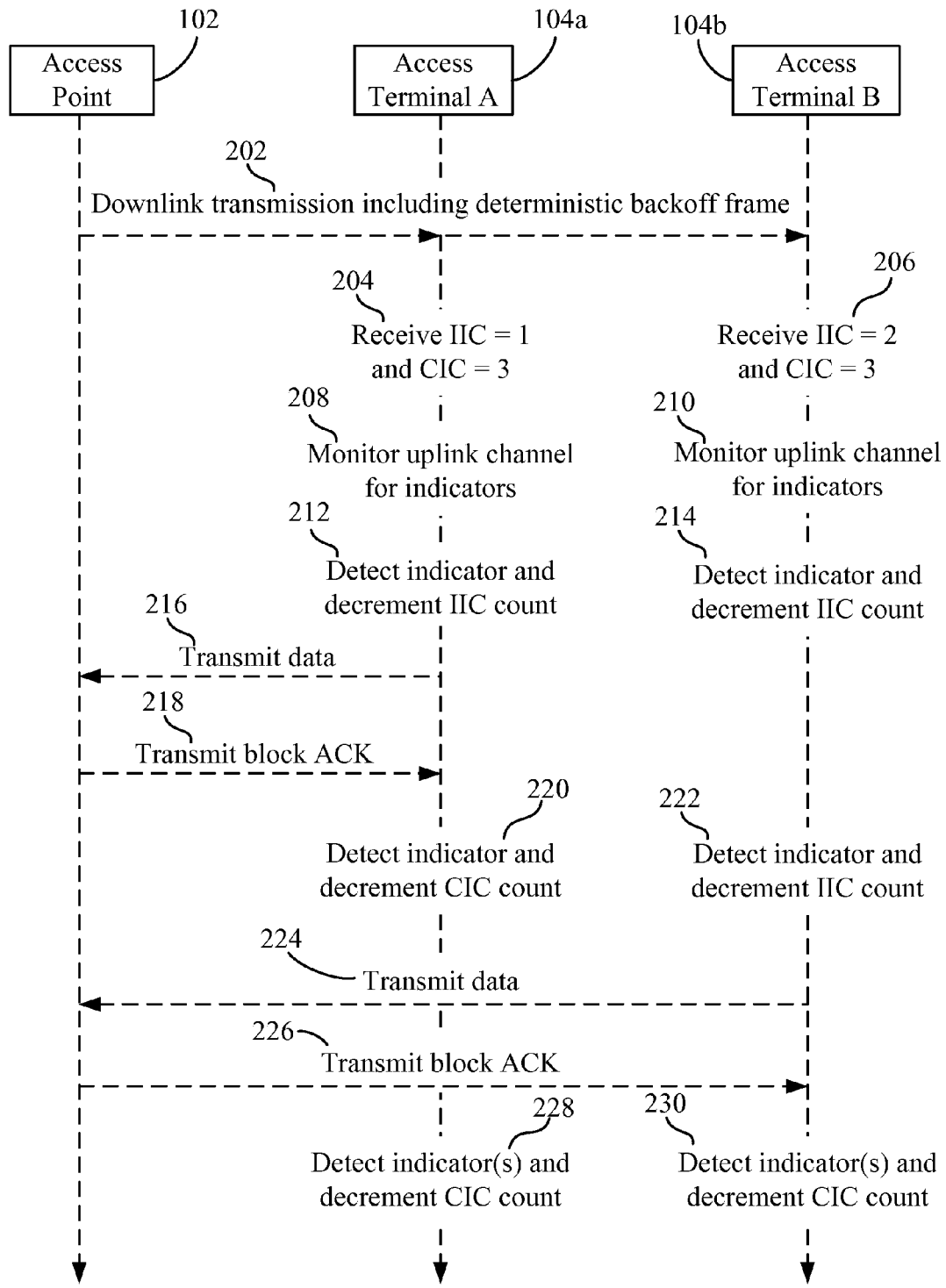
FIG. 2 is a flow diagram illustrating the operation of a wireless communication system where an access point facilitates management of distributed channel access for a plurality of access terminals.

FIG. 2 is a flow diagram illustrating the operation of a wireless communication system where an access point facilitates management of distributed channel access for a plurality of access terminals. In this example, the access point 102, access terminal A 104a and access terminal B 104b of FIG. 1 are used for illustration purposes. The access point 102 may initially communicate a downlink transmission that includes a deterministic backoff frame 202. According to various implementations, the downlink transmission may comprise a downlink broadcast (or group) transmission, or a downlink unicast transmission.

The deterministic backoff frame may include one or more instructions for each access terminal indicating each access terminal's position in a transmission sequence. For example, the downlink transmission may include an instruction for each access terminal 104a and 104b to follow a specified number of indicators (or markers) during a transmission sequence that follows the downlink transmission. Such an instruction may comprise an initial (or first) indicator count (IIC) specifying the number of indicators that are to be detected by an access terminal before that particular access terminal is permitted to send a transmission on the shared transmission channel. The initial indicator count (IIC) designated to each access terminal is unique, so that a sequence can be established to allow each access terminal a position in the sequence for transmitting on the shared transmission channel.

The downlink transmission may further include another instruction for each access terminal 104a and 104b to follow a second number of indicators during a transmission sequence that may follow a transmission sent by the respective access terminal. This other instruction may comprise a continuation (or second) indicator count (CIC) specifying the number of indicators that are to be detected by an access terminal after that particular access terminal has already sent a preceding transmission and before that particular access terminal is permitted to send another (or subsequent) transmission. The continuation indicator count (CIC) is the same for all of the access terminals 104a and 104b. In general, the continuation indicator count (CIC) will comprise a number that is either equal to or greater than the number of access terminals assigned a transmission opportunity during a transmission sequence.

In the particular example of FIG. 2, the access terminal A 104a receives 204 an initial indicator count (IIC) of one (1) and a continuation indicator count (CIC) of three (3). The access terminal B 104b receives 206 an initial indicator count (IIC) of two (2) and the same continuation indicator count (CIC) of three (3). Upon receipt of the respective instructions, each access terminal 104a and 104b monitors the shared transmission channel in order to detect indicators 208, 210. According to at least some embodiments, the indicators may comprise an empty backoff slot. Upon occurrence of an indicator, each access terminal 104a and 104b may detect the indicator, and may decrement their respective initial indicator counts (IIC) 212, 214. In an alternative embodiment, the access terminals 104a and 104b may just keep a running total of the number of indicators detected and compare the number of detected indicators to the number specified by their respective initial indicator count (IIC) to determine whether they are the same, which would indicate that the access terminal is permitted to transmit on the transmission channel.

As noted above, the received initial indicator count (IIC) at the access terminal A 104a was one (1). Therefore, decrementing the initial indicator count (IIC) at access terminal A 104a drops the count to zero (0). When the initial indicator count (IIC) is run down to zero (0) (or when the total number of detected indicators is equal to the IIC), the access terminal A 104a knows that it is next in the transmission sequence and has priority to use the next uplink transmission opportunity for transmitting 216 data to the access point 102. Upon receipt of the data from the access terminal A 104a, the access point 102 may send a transmission to the access terminal A 104a including a block acknowledgement 218.

The access terminals 104a and 104b continue monitoring the uplink transmission channel for indicators. Upon detection of another indicator, the access terminal A 104a decrements its continuation indicator count (CIC) 220 and the access terminal B 104b decrements its initial indicator count (IIC) 222, since the access terminal A 104a has already sent a transmission and the access terminal B 104b has not. Accordingly, the continuation indicator count (CIC) for the access terminal A 104a drops from three (3) to two (2), while the initial indicator count (IIC) for the access terminal B 104b drops from one (1) to zero (0).

With its initial indicator count (IIC) at zero (0), the access terminal B 104b knows that it is next in the transmission sequence and has priority to use the next transmission opportunity to send 224 data to the access point 102. Upon receipt of the transmitted data from the access terminal B 104b, the access point 102 may send a transmission to the access terminal B 104b that includes a block acknowledgement 226.

The access terminals 104a and 104b continue monitoring the uplink transmission channel for indicators. Upon detection of one or more other indicators, both the access terminals 104a and 104b decrement their continuation indicator counts (CIC) 228, 230, since both access terminals 104a and 104b have previously sent a transmission. For example, after the detection of the next indicator, the continuation indicator count (CIC) for the access terminal A 104a will drop from two (2) to one (1), while the continuation indicator count (CIC) for the access terminal B 104b will drop from three (3) to two (2). Upon detection of yet another indicator, the continuation indicator count (CIC) for the access terminal A 104a will drop to zero (0), indicating that the access terminal 104a is the next in the transmission sequence and has priority to use the next transmission opportunity.

Exemplary Transmission Scheme for Distributed Uplink Transmissions

Figure 3:
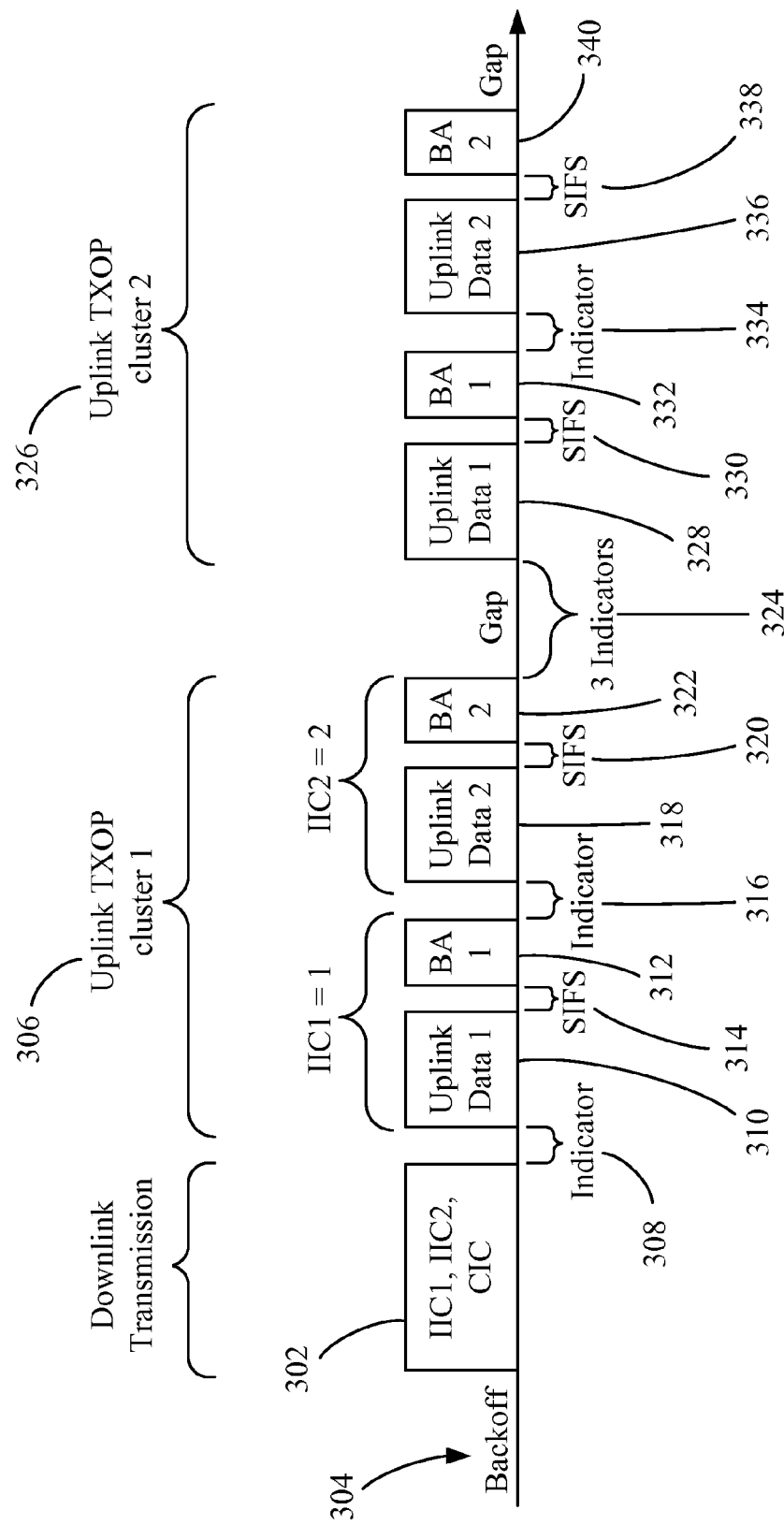
FIG. 3 is a block diagram illustrating an example of a transmission scheme for managing distributed channel access of a shared transmission channel among a plurality of access terminals.

Turning to FIG. 3, a block diagram is shown, illustrating an example of a transmission scheme between an access point and multiple access terminals for managing distributed channel access of a shared transmission channel. As illustrated, a transmission 302 may be wirelessly communicated in the downlink direction following a backoff 304. The downlink transmission 302 may be sent by an access point, such as the access point 102 of FIG. 1, to a plurality of access terminals, such as the access terminals 104 of FIG. 1 as either a broadcast (or group) transmission or as a unicast transmission.

The downlink transmission 302 includes instructions for the access terminals telling each access terminal to follow a respective number of indicators during a transmission sequence that follows the downlink transmission 302. In the example of FIG. 3, the instructions comprise a unique initial (or first) indicator count (e.g., IIC1, IIC2) assigned to each access terminal and a continuation (or second) indicator count (CIC) that is the same value for all the access terminals. By defining a unique initial indicator count (IIC) for each access terminal, the access point defines a sequence in which the access terminals may send distributed uplink transmissions during an uplink transmission opportunity. Furthermore, by defining a global continuation indicator count (CIC) for all the access terminals, the access point defines the same sequence to continue for subsequent clusters of uplink transmission opportunities.

By way of example and not limitation, the downlink transmission may include a deterministic backoff frame assigning an initial indicator count (IIC1) of one (1) to a first access terminal AT1, and an initial indicator count (IIC2) of two (2) to a second access terminal AT2. Furthermore, both of the first and second access terminals AT1, AT2 may be assigned a continuation indicator count (CIC) of four (4).

With receipt of the various instructions from the downlink transmission 302, the access terminals may begin monitoring for indicators in order to identify when each respective access terminal is permitted to transmit during a first cluster of uplink transmission opportunities 306. In some implementations, an indicator may comprise a slot having a predefined characteristic. By way of example and not limitation, an indicator may comprise an empty slot, such as an empty backoff slot. Such backoff slots are defined in the IEEE 802.11-2007 standard, which is herein incorporated by reference in its entirety. A backoff slot is typically shorter than a transmission slot. In some implementations, the backoff slot may occur only after a predetermined interframe space during which there are no transmissions on the transmission channel. In some examples, the predetermined interframe space, which precedes a backoff slot employed as an indicator, may comprise a short interframe space (SIFS), an arbitration interframe space (AIFS), a point coordination function (PCF) interframe space (PIFS), or a distributed coordination function (DCF) interframe space (DIFS). These various interframe spaces (SIFS, AIFS, PIFS, DIFS) are conventionally used in IEEE 802.11 based Wireless LANs for defining a fixed time interval to wait before occupying the wireless medium.

Following the downlink transmission 302, a first indicator (e.g., an empty backoff slot or an interframe space combined with an empty backoff slot) 308 may occur. Upon detection of the first indicator 308, the first access terminal AT1 that was assigned an initial indicator count (IIC) of one (1) may send a transmission 310 in the uplink direction. The uplink transmission 310 from the first access terminal AT1 may comprise an aggregated MAC protocol data unit (A-MPDU) including uplink data. The transmission of uplink data from the first access terminal AT1 may carry an implied request for the access point to transmit a block acknowledgement, or the A-MPDU may include a block acknowledgement request frame with immediate acknowledgement policy. Accordingly, the access point may transmit a block acknowledgement (BA1) 312 following the duration of a short interframe space (SIFS) 314.

After the downlink transmission 312 from the access point, a second indicator (e.g., empty backoff slot or an interframe space combined with an empty backoff slot) 316 may occur. Because the first access terminal AT1 has already sent the uplink transmission 310 during the transmission sequence of the first cluster of uplink transmission opportunities 306, the second indicator 316 will be recorded by the first access terminal in relation to the continuation indicator count (CIC). That is, since the first access terminal AT1 has completed its initial indicator count (IIC) and has sent an uplink transmission on the shared transmission channel, all subsequent indicators detected by the first access terminal AT1 will be applied by the first access terminal AT1 to its continuation indicator count (CIC).

Upon detection of the second indicator 316 by the second access terminal AT2 that was assigned an initial indicator count (IIC) of two (2), the second access terminal AT2 may send a transmission 318 in the uplink direction. The uplink transmission 318 from the second access terminal AT2 may also comprise an aggregated MAC protocol data unit (A-MPDU) including uplink data. Following a short interframe space (SIFS) 320, the access point may transmit a block acknowledgement (BA2) 322 to the second access terminal AT2.

Following the downlink transmission 322 from the access point, additional indicators 324 may occur. Since both the first and second access terminals have sent uplink transmissions during the first cluster of uplink transmission opportunities 306, the additional indicators are detected by the two access terminals in relation to their respective continuation indicator counts (CIC). Because there are no other access terminals that are active in the uplink transmission opportunity, and since the continuation indicator count (CIC) was originally assigned a value of 4 indicators, a gap occurs between two transmission sequences. That is, a gap occurs between the first cluster of uplink transmission opportunities 306, and a second cluster of uplink transmission opportunities 326. The gap between the first cluster of uplink transmission opportunities 306 and the second cluster of uplink transmission opportunities 326 may be defined by the simple equation, gap=continuation indicator count (CIC)−the number of active access terminals per cluster+one indicator. Therefore, in the present example, the gap will be defined by 3 indicators 324 (i.e., gap=4−2+1). Proving this equation becomes apparent upon review of FIG. 3. Because each access terminal detects the number of indicators defined by the continuation indicator count (CIC) before sending another (or subsequent) transmission, the first access terminal AT1 detects three more indicators before starting another transmission sequence. That is, the first access terminal AT1 detects only one indicator (the second indicator 316) after sending the transmission 310 before all the active access terminals have completed an uplink transmission. Thus, the first access terminal AT1 detects another three (3) indicators before sending another transmission, in order to meet the four (4) indicator count defined by the continuation indicator count (CIC) that was received by the access terminals.

After the three indicators 324 (e.g., three empty backoff slots or three combinations of an interframe space and an empty backoff slot) are detected by the first access terminal AT1 during the gap period, the first access terminal AT1 may send another (or subsequent) uplink transmission 328. Following a short interframe space (SIFS) 330, the access point may transmit a downlink transmission including a block acknowledgement (BA2) 332 to the first access terminal AT1.

Another indicator 334 (e.g., empty backoff slot or an interframe space combined with an empty backoff slot) may occur after the downlink transmission 332 from the access point. Upon detection of the indicator 334 by the second access terminal AT2, a total of four (4) indicators will have been detected by the second access terminal following its sent (previous) transmission 318 (i.e., three (3) indicators 324 during the gap and one (1) indicator 334 following the transmission 328 from the first access terminal AT1). The second access terminal AT2 may therefore send another (or subsequent) transmission 336 in the uplink direction. Following a short interframe space (SIFS) 338, the access point may transmit a downlink transmission including a block acknowledgement (BA2) 340 to the second access terminal AT2. Another gap may occur, and subsequent clusters of sequenced transmission opportunities may continue indefinitely.

According to a feature, the access point may insert one or more new access terminals into the distributed transmission sequence by assigning the new access terminal(s) a position inside the gap between the clusters of uplink transmission opportunities 306 and 326. In the present example, two new access terminals may be added to the transmission sequence. For instance, the access point may send a downlink transmission to each new access terminal (e.g., a third and fourth access terminals AT3, AT4). The downlink transmission comprises instructions for the new access terminals that include a unique initial indicator count (IIC) assigned to each new access terminal (e.g., IIC=3 for AT3, and IIC=4 for AT4), and the continuation indicator count (CIC) that was assigned to the previous access terminals (e.g., CIC=4). The two new access terminals AT3 and AT4 will then fill transmission opportunities in the gap.

When the gap between the clusters 306 and 326 becomes too small (e.g., after adding access terminals AT3 and AT4), but the access point desires to add more new access terminals, then the access point can send a new downlink transmission specifying a new initial indicator counter (IIC) for each access terminal and a larger continuation indicator count (CIC) to accommodate the additional access terminals. New gaps may occur in a transmission sequence when one or more access terminals cease transmitting.

According to a feature, the access point may set a network allocation vector (NAV) to protect one or more uplink transmission opportunity clusters. The network allocation vector (NAV) may be reset by the various access terminals whenever a downlink transmission is received that includes instructions telling the access terminals to follow a respective number of indicators during a transmission sequence.

According to another feature, when a transmission fails and a retransmission is to be sent, a retry backoff may be set initially to the continuation indicator count (CIC). If repeated collisions occur, the retry backoff may be increased to a period greater than the continuation indicator count (CIC). In this case, ordering may be lost, which may necessitate resetting the ordering to continue with a subsequent transmission sequence.

Exemplary Access Terminal

Figure 4:
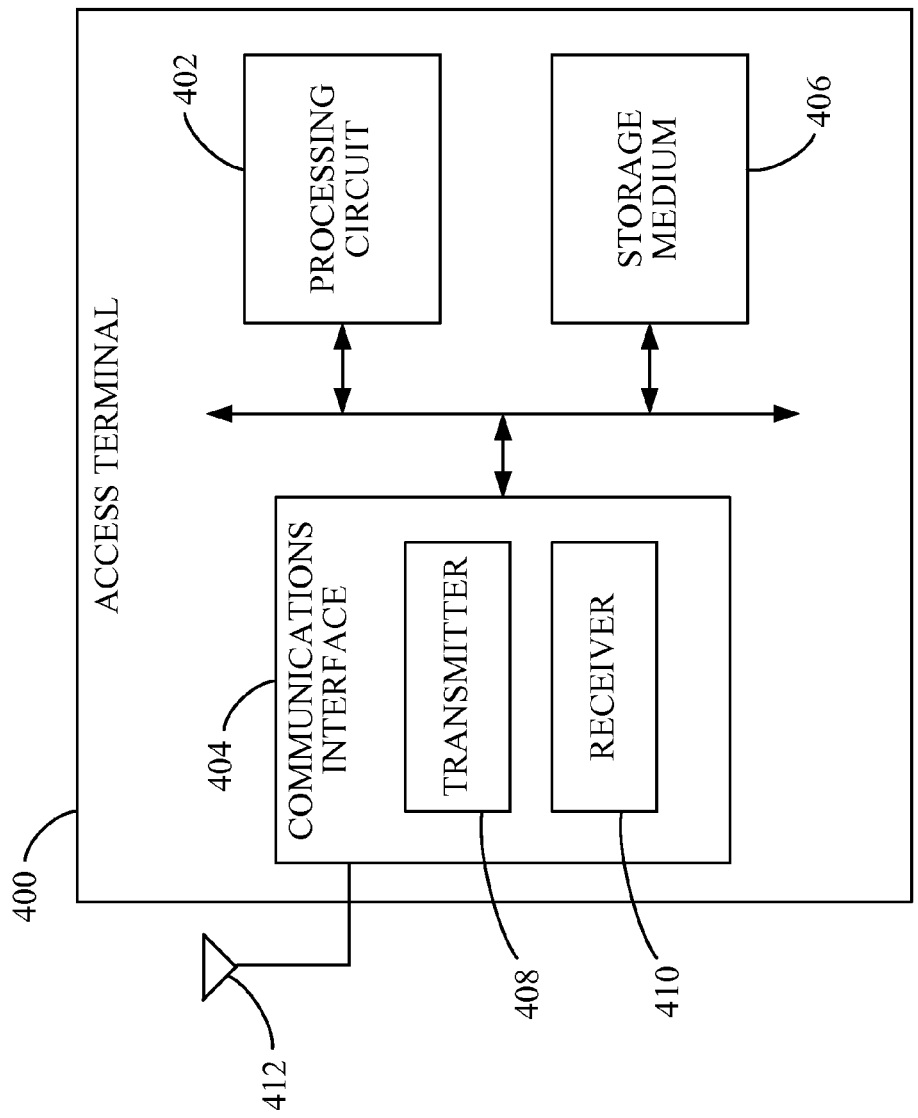
FIG. 4 is a block diagram illustrating select components of an access terminal according to at least one implementation.

FIG. 4 is a block diagram illustrating select components of an access terminal 400 according to at least one implementation. The access terminal 400 may include a processing circuit 402 coupled to a communications interface 404 and to a storage medium 406.

The processing circuit 402 is arranged to obtain, process and/or send data, control data access and storage, issue commands, and control other desired operations. The processing circuit 402 may comprise circuitry configured to implement desired programming provided by appropriate media in at least one embodiment. For example, the processing circuit 402 may be implemented as one or more of a processor, a controller, a plurality of processors and/or other structure configured to execute executable instructions including, for example, software and/or firmware instructions, and/or hardware circuitry. Embodiments of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 402 are for illustration and other suitable configurations within the scope of the present disclosure are also contemplated.

The communications interface 404 is configured to facilitate wireless communications of the access terminal 400. The communications interface 404 may include at least one transmitter 408 and/or at least one receiver 410 (e.g., one or more transmitter/receiver chains). Furthermore, one or more antennas 412 may be electrically coupled to the communications interface 404. According to at least one implementation, the communications interface 404 may be adapted to facilitate wireless communications in an Institute of Electrical and Electronics Engineers (IEEE) 802.11 wireless local area network (WLAN).

The storage medium 406 may represent one or more devices for storing programming and/or data, such as processor executable code or instructions (e.g., software, firmware), electronic data, databases, or other digital information. The storage medium 406 may be any available media that can be accessed by a general purpose or special purpose processor. By way of example and not limitation, the storage medium 406 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 406 may be coupled to the processing circuit 402 such that the processing circuit 402 can read information from, and write information to, the storage medium 406. In the alternative, the storage medium 406 may be integral to the processing circuit 402.

According to one or more features of the access terminal 400, the processing circuit 402 may be adapted to perform any or all of the processes, functions, steps and/or routines related to the various access terminals as described herein above with reference to FIGS. 1-3 (e.g., access terminal 104, AT1, AT2, AT3 and/or AT4). As used herein, the term "adapted" in relation to the processing circuit 402 may refer to the processing circuit 402 being one or more of configured, employed, implemented, or programmed to perform a particular process, function, step and/or routine according to various features.

Figure 5:
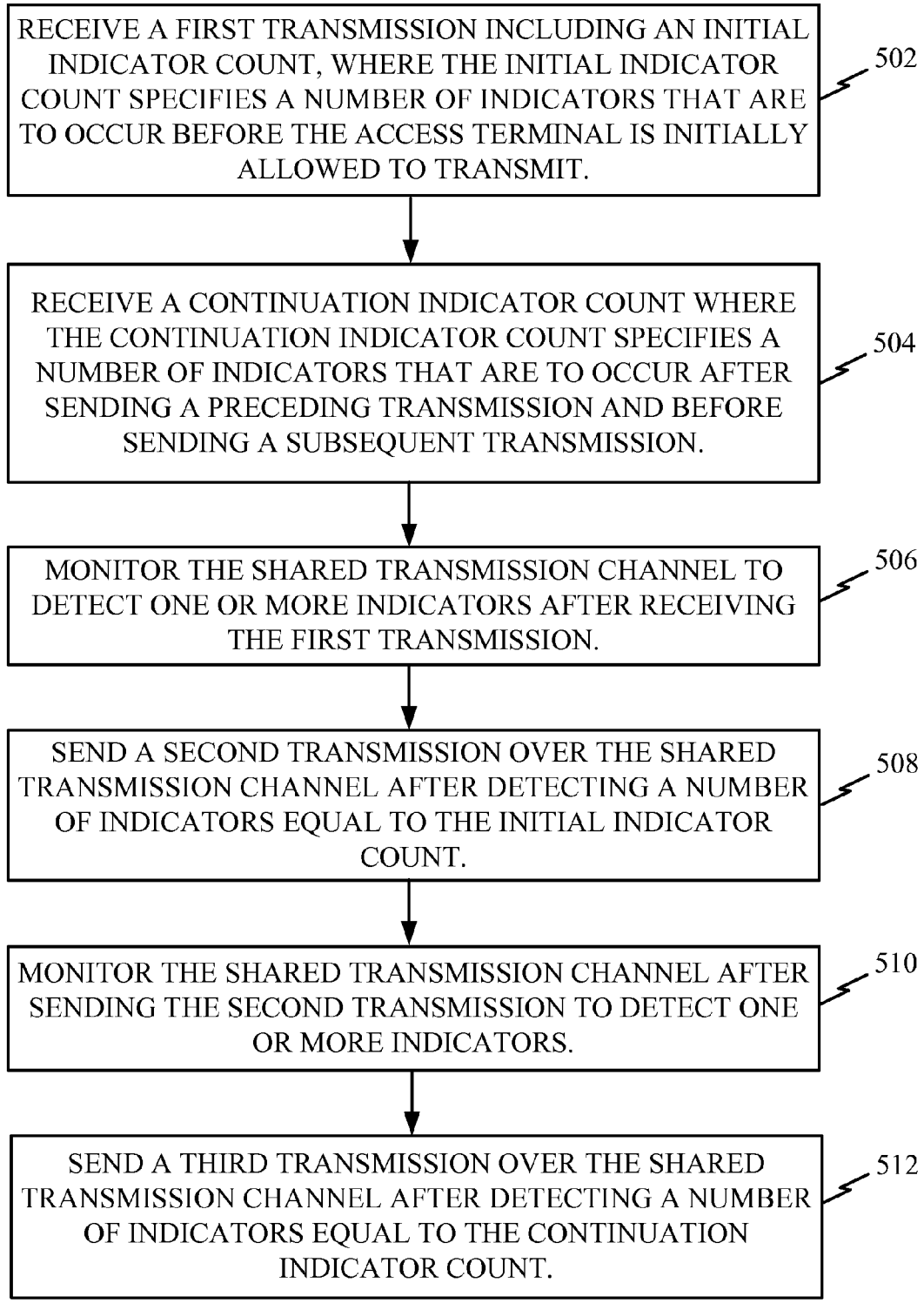
FIG. 5 is a flow diagram illustrating an example of at least one implementation of a method operational on an access terminal.

FIG. 5 is a flow diagram illustrating an example of at least one implementation of a method operational on an access terminal, such as the access terminal 400. With reference to both of FIGS. 4 and 5, a transmission may be received at step 502. The transmission may include an instruction for the access terminal 400 to follow a first number of indicators when transmitting during a transmission sequence that follows the received transmission. For example, a downlink transmission may be wirelessly transmitted from an access point, and may be received by the processing circuit 402 via the communications interface 404. The instruction may comprise an initial (or first) indicator count specifying a number of indicators that are to occur before the access terminal 400 is initially allowed to transmit. As noted above, an indicator may comprise an empty backoff slot. In addition, each empty backoff slot may be preceded by an interframe space.

The access terminal 400 may further receive another instruction, either in the originally received transmission or in another transmission. The other instruction may comprise a continuation (or second) indicator count specifying a number of indicators that are to occur after the access terminal sends a preceding transmission (e.g., the second transmission) and before the access terminal is allowed to send a subsequent transmission (e.g., a third transmission) 504. For example, the processing circuit 402 may receive via the communications interface 404 the continuation (or second) indicator count specifying a number of indicators the access terminal is assigned to wait, after sending a preceding transmission (e.g., the second transmission) and before sending a subsequent transmission (e.g., a third transmission). The continuation (or second) indicator count is the same value for all access terminals sharing a common transmission channel. The continuation (or second) indicator count may specify a number of empty backoff slots that the access terminal 400 is to follow when transmitting during the transmission sequence following a transmission sent by the access terminal 400.

Following the received transmission, a shared transmission channel may be monitored to detect one or more indicators 506. For example, the processing circuit 402 may monitor the transmission channel to detect one or more empty backoff slots. Upon the detection of a number of indicators equal to the initial (or first) indicator count (after receiving the transmission at step 502), the access terminal 400 may send a transmission over the shared transmission channel 508. For example, the processing circuit 402, upon detection of a number of indicators matching the initial (or first) indicator count, may send a transmission via the communications interface 404.

After sending the transmission, the access terminal 400 may again monitor the shared transmission channel to detect one or more indicators 510. When a number of indicators is detected that matches the continuation (or second) indicator count, a third transmission may be sent over the shared transmission channel 512. For example, after the first transmission is sent at step 508, the processing circuit 402 may monitor the shared transmission channel to detect indicators until the processing circuit 402 has detected a number of indicators equal to the number specified by the continuation (or second) indicator count. When the number of indicators matching the continuation (or second) indicator count is detected, the processing circuit may send another transmission via the communications interface 404. In one example, the access terminal may receive the indicators on a downlink channel distinct from an uplink channel (e.g., shared transmission channel) over which the access terminal transmits.

Exemplary Access Point

Figure 6:
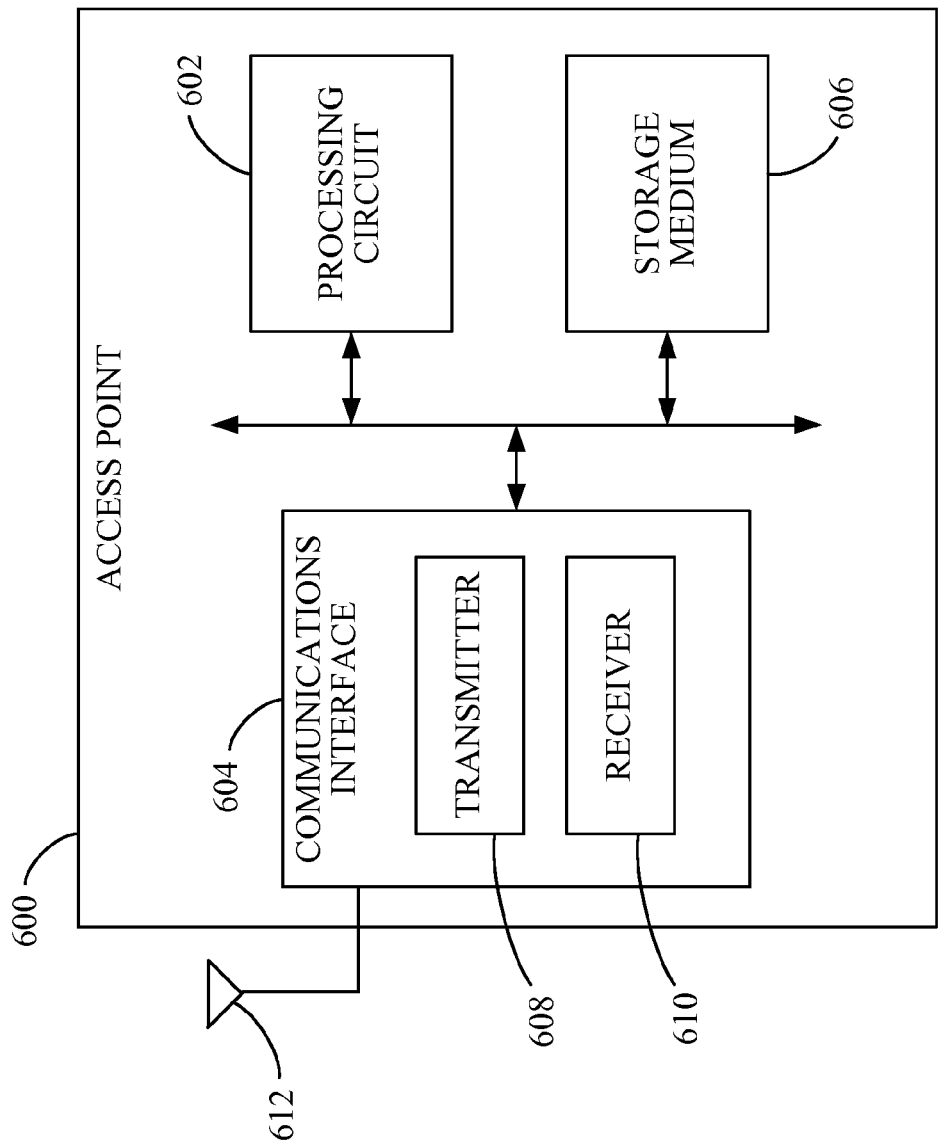
FIG. 6 is a block diagram illustrating select components of an access point according to at least one implementation.

FIG. 6 is a block diagram illustrating select components of an access point according to at least one implementation. As shown, an access point 600 may include a processing circuit 602 coupled to a communications interface 604 and to a storage medium 606.

The processing circuit 602 is arranged to obtain, process and/or send data, control data access and storage, issue commands, and control other desired operations. The processing circuit 602 may comprise circuitry configured to implement desired programming provided by appropriate media in at least one embodiment. For example, the processing circuit 602 may be implemented as one or more of a processor, a controller, a plurality of processors and/or other structure configured to execute executable instructions including, for example, software and/or firmware instructions, and/or hardware circuitry. Embodiments of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 602 are for illustration and other suitable configurations within the scope of the present disclosure are also contemplated.

The communications interface 604 is configured to facilitate wireless communications of the access point 600. The communications interface 604 may include at least one transmitter 608 and/or at least one receiver 610 (e.g., one or more transmitter/receiver chains). Furthermore, one or more antennas 612 may be electrically coupled to the communications interface 604. According to at least one implementation, the communications interface 604 may be adapted to facilitate wireless communications in an Institute of Electrical and Electronics Engineers (IEEE) 802.11 wireless local area network (WLAN).

The storage medium 606 may represent one or more devices for storing programming and/or data, such as processor executable code or instructions (e.g., software, firmware), electronic data, databases, or other digital information. The storage medium 606 may be any available media that can be accessed by a general purpose or special purpose processor. By way of example and not limitation, the storage medium 606 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 606 may be coupled to the processing circuit 602 such that the processing circuit 602 can read information from, and write information to, the storage medium 606. In the alternative, the storage medium 606 may be integral to the processing circuit 602.

According to one or more features, the processing circuit 602 may be adapted to perform any or all of the processes, functions, steps and/or routines related to the various access points as described herein above with reference to FIGS. 1-3 (e.g., access point 102). As used herein, the term "adapted" in relation to the processing circuit 602 may refer to the processing circuit 602 being one or more of configured, employed, implemented, or programmed to perform a particular process, function, step and/or routine according to various features.

Figure 7:
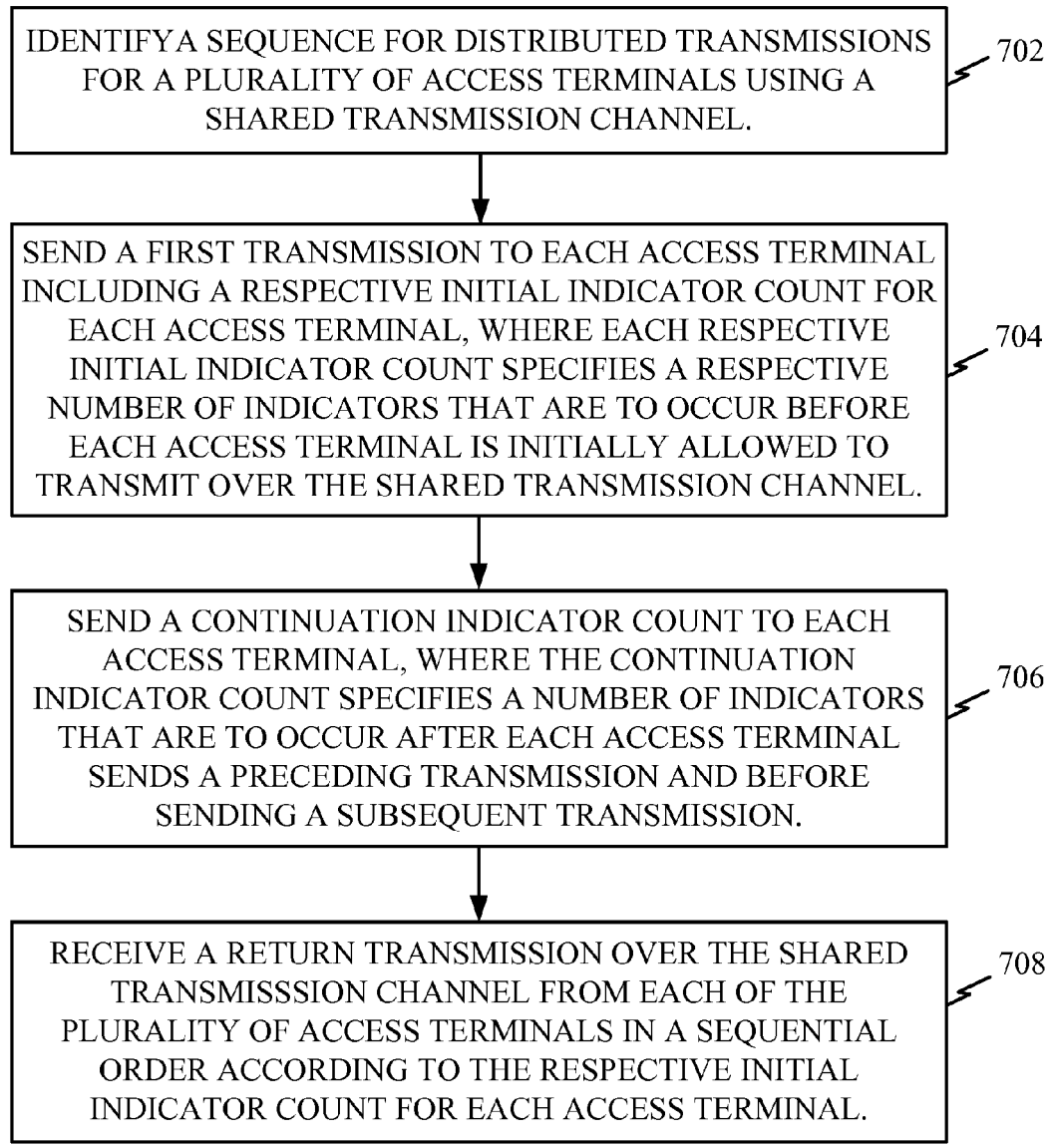
FIG. 7 is a flow diagram illustrating an example of at least one implementation of a method operational on an access point.

FIG. 7 is a flow diagram illustrating an example of at least one implementation of a method operational on an access point, such as access point 600. With reference to both of FIGS. 6 and 7, a sequence may be identified for distributed channel access for a plurality of access terminals using a shared (common) transmission channel 702. For example, a plurality of access terminals that are actively transmitting on a transmission channel may be identified. The processing circuit 602 may determine or may receive a sequence that assigns a particular order to each active access terminal of the plurality of access terminals. That is, each access terminal is assigned a respective (or unique) number of indicators that it is to follow when transmitting during a transmission opportunity.

A (first) transmission may be sent to each of the access terminals including an initial (or first) indicator count for each respective access terminal, where the initial (or first) indicator count specifies a respective number of indicators that are to occur before each access terminal is initially allowed to transmit over the shared transmission channel 704. For example, the processing circuit 602 may send a downlink transmission via the communications interface 604 including the initial (or first) indicator count for each access terminal. The transmission may be sent as either a broadcast (or group) transmission or a unicast transmission. According to at least one implementation, an indicator may comprise an empty backoff slot.

The access point 600 may further send another instruction, either in the originally sent transmission or in another transmission. The other instruction may comprise a continuation (or second) indicator count for the plurality of access terminals 706. For example, the processing circuit may include the continuation (or second) indicator count in the original transmission sent at step 704. The continuation (or second) indicator count may tell each access terminal to wait for a number of indicators equal to the continuation (or second) indicator count after sending a respective preceding transmission and before sending a respective subsequent transmission. The continuation (or second) indicator count is the same value for all the access terminals sharing a common transmission channel.

A (return) transmission may be received over the shared transmission channel from each of the access terminals in a sequential order according to their respective initial (or first) indicator counts 708. For example, the processing circuit 602 may receive, via the communications interface 604, an uplink transmission from each of the plurality of access terminals over the shared transmission channel. The plurality of transmissions may each be received in the identified order, where each access terminal transmits a transmission after the occurrence of a number of indicators equaling their respective initial (or first) indicator count.

One or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 4 and/or 6 may be configured to perform one or more of the methods, features, or steps described in FIGS. 2, 3, 5 and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An access terminal comprising:
a communications interface adapted to facilitate wireless communications via a shared transmission channel, wherein multiple access terminals communicate via the shared transmission channel; and
a processing circuit coupled to the communications interface, the processing circuit adapted to:
receive a first incoming transmission including multiple first indicator counts via the communications interface, wherein each access terminal of the multiple access terminals corresponds to a different first indicator count of the multiple first indicator counts;
identify a particular first indicator count of the multiple first indicator counts, wherein the processing circuit is permitted to send a first outgoing transmission via the shared transmission channel after detecting a number of indicators based on the particular first indicator count;
after receiving the first incoming transmission, monitor the shared transmission channel to detect one or more indicators; and
send the first outgoing transmission via the communications interface responsive to a count of the one or more indicators.

2. The access terminal of claim 1, wherein the communications interface is adapted to facilitate wireless communications via an Institute of Electrical and Electronics Engineers (IEEE) 802.11 compliant wireless local area network (WLAN).

3. The access terminal of claim 1, wherein an indicator comprises an empty backoff slot.

4. The access terminal of claim 3, wherein the empty backoff slot occurs after an interframe space during which no transmission is detected at the processing circuit via the shared transmission channel.

5. The access terminal of claim 4, wherein the interframe space comprises a time interval associated with one of a short interframe space (SIFS), an arbitration interframe space (AIFS), or a point coordination function (PCF) interframe space (PIFS).

6. The access terminal of claim 1, wherein the particular first indicator count specifies a first number of empty backoff slots to occur prior to the processing circuit sending the first outgoing transmission.

7. The access terminal of claim 1, wherein:
the first incoming transmission further includes a second indicator count; and
the processing circuit is assigned to detect a number of additional indicators based on the second indicator count prior to being permitted to send a subsequent transmission, wherein the additional indicators are detected after sending a preceding transmission.

8. The access terminal of claim 7, wherein the processing circuit is further adapted to:
after sending the first outgoing transmission, monitor the shared transmission channel to detect one or more additional indicators; and
send a second outgoing transmission via the communications interface responsive to a count of the one or more additional indicators.

9. The access terminal of claim 8, wherein the number of additional indicators is one, and wherein the one or more additional indicators is a single additional indicator.

10. The access terminal of claim 8, wherein the processing circuit is further adapted to send the second outgoing transmission when the count of the one or more additional indicators is equal to the second indicator count.

11. The access terminal of claim 7, wherein the second indicator count corresponds to at least two access terminals of the multiple access terminals.

12. The access terminal of claim 7, wherein the second indicator count specifies a second number of empty backoff slots that are to occur prior to the subsequent transmission.

13. The access terminal of claim 7, wherein the processing circuit is further adapted to set a retry backoff count in response to a failure to send the first outgoing transmission, and wherein the retry backoff count is set to a value of the second indicator count.

14. The access terminal of claim 13, wherein the processing circuit is further adapted to increase the retry backoff count in response to an additional failure to send the first outgoing transmission.

15. The access terminal of claim 1, wherein the processing circuit is further adapted to reset a network allocation vector (NAV) in response to receipt of the first incoming transmission.

16. The access terminal of claim 1, wherein the first incoming transmission further includes a second indicator count, and wherein the second indicator count is associated with the multiple access terminals.

17. The access terminal of claim 1, wherein the number of indicators is one, and wherein the one or more indicators are a single indicator.

18. The access terminal of claim 1, wherein the processing circuit is further adapted to send the first outgoing transmission when the count of the one or more indicators is equal to the particular first indicator count.

19. A method comprising:
receiving a first incoming transmission including multiple first indicator counts at a particular access terminal of multiple access terminals communicating via a shared transmission channel, wherein each access terminal of the multiple access terminals corresponds to a different first indicator count of the multiple first indicator counts;
identify a particular first indicator count of the multiple first indicator counts, wherein the particular access terminal is permitted to send a first outgoing transmission via the shared transmission channel after detecting a number of indicators based on the particular first indicator count;
after receiving the first incoming transmission, monitoring the shared transmission channel to detect one or more indicators; and
sending the first outgoing transmission via the shared transmission channel responsive to a count of the one or more indicators.

20. The method of claim 19, wherein an indicator comprises an empty backoff slot, and wherein the empty backoff slot occurs after an interframe space during which no transmission is detected at the particular access terminal via the shared transmission channel.

21. The method of claim 20, wherein the interframe space comprises a time interval associated with a point coordination function (PCF) interframe space (PIFS).

22. The method of claim 19, further comprising receiving a second indicator count at the particular access terminal, wherein the second indicator count specifies a number of additional indicators to be detected after sending a preceding transmission, and wherein the additional indicators are detected prior to sending a subsequent transmission.

23. The method of claim 22, further comprising:
after sending the first outgoing transmission, monitoring the shared transmission channel to detect one or more additional indicators; and
sending a second outgoing transmission responsive to a count of the one or more additional indicators.

24. An apparatus comprising:
means for receiving a first incoming transmission including multiple first indicator counts via a shared transmission channel, wherein multiple access terminals communicate via the shared transmission channel, and wherein each access terminal of the multiple access terminals corresponds to a different first indicator count of the multiple first indicator counts;
means for identifying a particular first indicator count of the multiple first indicator counts, wherein a first outgoing transmission is permitted to be sent via the shared transmission channel after detecting a number of indicators based on the particular first indicator count;
means for monitoring the shared transmission channel to detect one or more indicators, wherein the one or more indicators are detected after receipt of the first incoming transmission; and
means for sending the first outgoing transmission via the shared transmission channel responsive to a count of the one or more indicators.

25. The apparatus of claim 24, wherein the first incoming transmission further includes a second indicator count, wherein the second indicator count specifies a number of additional indicators to be detected prior to sending a subsequent transmission, and wherein the additional indicators are detected after sending a preceding transmission.

26. The apparatus of claim 25, further comprising:
means for monitoring the shared transmission channel to detect one or more additional indicators, wherein the one or more additional indicators are detected after sending the first outgoing transmission; and
means for sending a second outgoing transmission via the shared transmission channel responsive to a count of the one or more additional indicators.

27. A non-transitory processor-readable medium comprising instructions that, when executed by a processor, cause the processor to:
receive a first incoming transmission including multiple first indicator counts at a particular access terminal of multiple access terminals communicating via a shared transmission channel, wherein each access terminal of the multiple access terminals corresponds to a different first indicator count of the multiple first indicator counts;
identify a particular first indicator count of the multiple first indicator counts, wherein the particular access terminal is permitted to send a first outgoing transmission via the shared transmission channel after detecting a number of indicators based on the particular first indicator count;
after receiving the first incoming transmission, monitor the shared transmission channel to detect one or more indicators; and
send the first outgoing transmission via the shared transmission channel responsive to a count of the one or more indicators.

28. The non-transitory processor-readable medium of claim 27, wherein the first incoming transmission further includes a second indicator count, wherein the particular access terminal is assigned to detect a number of additional indicators based on the second indicator count prior to sending a second outgoing transmission, and wherein the additional indicators are detected after sending the first outgoing transmission.

29. An access point comprising:
a communications interface adapted to facilitate wireless communications via a shared transmission channel, wherein a plurality of access terminals communicate via the shared transmission channel; and
a processing circuit coupled to the communications interface, the processing circuit adapted to:
send an outgoing transmission including multiple first indicator counts via the communications interface to the plurality of access terminals, wherein each access terminal of the plurality of access terminals corresponds to a different first indicator count of the multiple first indicator counts, and wherein a particular access terminal of the plurality of access terminals is permitted to send a return transmission via the shared transmission channel after detecting a number of indicators based on a particular first indicator count of the multiple first indicator counts; and
receive, via the communications interface, a plurality of return transmissions from the plurality of access terminals in a sequential order, wherein the sequential order is associated with the multiple first indicator counts.

30. The access point of claim 29, wherein the communications interface is adapted to facilitate wireless communications via an Institute of Electrical and Electronics Engineers (IEEE) 802.11 compliant wireless local area network (WLAN).

31. The access point of claim 29, wherein an indicator comprises an empty backoff slot, and wherein the empty backoff slot occurs after an interframe space during which no transmission is detected at the processing circuit via the shared transmission channel.

32. The access point of claim 31, wherein the interframe space comprises a time interval associated with an arbitration interframe space (AIFS).

33. The access point of claim 29, wherein the outgoing transmission further includes a second indicator count, wherein at least one particular access terminal of the plurality of access terminals is assigned to detect a number of additional indicators based on the second indicator count prior to sending a subsequent return transmission, and wherein the additional indicators are detected after a preceding return transmission is sent by the at least one particular access terminal.

34. The access point of claim 33, wherein the second indicator count comprises a number that is equal to or greater than a number of access terminals comprising the plurality of access terminals.

35. The access point of claim 33, wherein the second indicator count is associated with each access terminal of the plurality of access terminals.

36. The access point of claim 29, wherein the processing circuit is further adapted to, in response to receiving a particular return transmission from the particular access terminal, send a block acknowledgement to the particular access terminal after a time interval associated with a short interframe space (SIFS).

37. The access point of claim 29, wherein the processing circuit is further adapted to schedule a transmission gap between a first transmission sequence and a second transmission sequence based on a second indicator count included in the transmission.

38. The access point of claim 37, wherein the first transmission sequence comprises one or more return transmissions received from the plurality of access terminals, and wherein the second transmission sequence comprises one or more subsequent return transmissions received from the plurality of access terminals, and wherein no return transmissions or subsequent return transmissions are received during the transmission gap.

39. The access point of claim 37, wherein the second indicator count is set to a particular number that is greater than a number of access terminals of the plurality of access terminals and greater than a second number of total transmissions during the first transmission sequence.

40. A method comprising:
sending an outgoing transmission including multiple first indicator counts to from an access point to a plurality of access terminals communicating via a shared transmission channel, wherein each access terminal of the plurality of access terminals corresponds to a different first indicator count of the multiple first indicator counts, and wherein a particular access terminal of the plurality of access terminals is permitted to send a return transmission via the shared transmission channel after detecting a number of indicator based on a particular first indicator count of the multiple first indicator counts; and
receiving, at the access point, a plurality of return transmissions via the shared transmission channel from the plurality of access terminals in a sequential order, wherein the sequential order is associated with the multiple first indicator counts.

41. The method of claim 40, wherein sending the outgoing transmission to the plurality of access terminals comprises sending one of a broadcast transmission or a unicast transmission.

42. The method of claim 40, wherein an indicator comprises an empty backoff slot, and wherein the empty backoff slot occurs after an interframe space during which no transmission is detected at the access point via the shared transmission channel.

43. The method of claim 42, wherein the interframe space comprises a time interval associated with a short interframe space (SIFS).

44. The method of claim 40, wherein the outgoing transmission further includes a second indicator count, wherein the second indicator count specifies a number of additional indicators to occur prior to the particular access terminal sending a subsequent return transmission, and wherein the additional indicators are detected after a preceding return transmission is sent by the particular access terminal.

45. An apparatus comprising:
means for sending an outgoing transmission including multiple first indicator counts to a plurality of access terminals communicating via a shared transmission channel, wherein each access terminal of the plurality of access terminals corresponds to a different first indicator count of the multiple first indicator counts, and wherein a particular access terminal of the plurality of access terminals is permitted to send a return transmission via the shared transmission channel after detecting a number of indicators based on a particular first indicator count of the multiple first indicator counts; and
means for receiving a plurality of return transmissions via the shared transmission channel from the plurality of access terminals in a sequential order, wherein the sequential order is associated with the multiple first indicator counts.

46. The apparatus of claim 42, wherein the outgoing transmission further includes a second indicator count, wherein at least one access terminal of the plurality of access terminals is assigned to detect a number of additional indicators based on the second indicator count prior to sending a subsequent return transmission, and wherein the additional indicators are detected after the at least one access terminal sends a preceding return transmission.

47. A non-transitory processor-readable medium comprising instructions that, when executed by a processor, cause the processor to:
send a first outgoing transmission including multiple first indicator counts to a plurality of access terminals communicating via a shared transmission channel, wherein each access terminal of the plurality of access terminals corresponds to a different first indicator count of the multiple first indicator counts, and wherein a particular access terminal of the plurality of access terminals is permitted to send a return transmission via the shared transmission channel after detecting a number of indicators based on a particular first indicator count of the multiple first indicator counts; and
receive a plurality of return transmissions via the shared transmission channel from the plurality of access terminals in a sequential order, wherein the sequential order is associated with the multiple first indicator counts.

48. The non-transitory processor-readable medium of claim 47, wherein an indicator comprises an empty backoff slot.

49. The non-transitory processor-readable medium of claim 47, further comprising instructions that, when executed by the processor, cause the processor to send a second outgoing transmission including a second indicator count via the shared transmission channel, wherein at least one access terminal of the plurality of access terminals is assigned to detect a number of additional indicators based on the second indicator count prior to sending a subsequent return transmission, and wherein the additional indicators are detected after the at least one access terminal sends a preceding return transmission.

* * * * *